United States Patent Office 3,373,592
Patented Mar. 19, 1968

3,373,592
SEVERING OF AN EXTRUSION DISC AND AN EXPULSION DISC FROM AN EXTRUSION RESIDUE AND AN EXTRUSION SKIRT IN A METAL-EXTRUSION PRESS
Helmut Robra, Mulheim (Ruhr), Otto Behrendt, Dusseldorf-Eller, and Winfried Steyvers, Dusseldorf-Oberkassel, Germany, assignors to Schloemann Aktiengesellschaft, Dusseldorf, Germany, a German company
Filed Nov. 10, 1965, Ser. No. 507,116
Claims priority, application Germany, Dec. 1, 1964, Sch 36,185
5 Claims. (Cl. 72—255)

ABSTRACT OF THE DISCLOSURE

Means for automatically severing the dummy block and the scavenging block of a metal extrusion press from the extrusion residue and the extrusion skirt, wherein a tool slide conveys the extrusion residue, with the extrusion skirt, the dummy block and the scavenging block from the extrusion axis of the press to a reception cylinder, whereupon the extrusion residue, with the extrusion skirt and the dummy block are pushed into the reception cylinder, while the scavenging block remains in a receiving aperture, the reception cylinder then being swung about an axis inclined at an angle of about 45° to a means for severing the dummy block from the extrusion residue and the extrusion skirt.

---

This invention relates to a means for the automatic separation of the dummy block or extrusion disc and of the scavenging block or expulsion disc of a metal-extrusion press from the extrusion residue and from the extrusion skirt, in which a tool slide impels the extrusion residue, together with the extrusion skirt, the extrusion disc and the expulsion disc, from the axis of the press to a receiving cylinder.

Various appliances for severing the extrusion disc of a metal-extrusion press from the extrusion residue and from the extrusion skirt are already known. In these, however, a special device is required for severing the expulsion disc from the extrusion skirt. Moreover complicated measures are adopted for transporting the extrusion residue and the extrusion skirt, with the expulsion disc, to the severing means. In order to enable the simplest possible transporting means to be used for severing the extrusion disc from the extrusion residue it is necessary to rock the extrusion residue out of the horizontal position into a vertical position.

The problem of the invention consists in obviating the known disadvantages, and providing means which will proceed automatically after the release of the initial impulse, for the automatic severing of the extrusion disc and the expulsion disc from the extrusion residue and the extrusion skirt. This is achieved, according to the invention, by pushing the extrusion residue, with the extrusion skirt and the extrusion disc, into a reception cylinder, and rocking the axis of the reception cylinder out of the axis of the expulsion trough. In this way the expulsion disc remains in the expulsion trough, so that upon the further rocking of the reception cylinder the extrusion skirt is severed from the expulsion disc. The pushing of the expulsion disc out of the tool slide is limited by a ratchet or latch.

According to a further feature of the invention the reception cylinder may be rotatably supported by being mounted on a lever arm rotatable transversely to its axis. In this case it is advantageous for the reception cylinder to be secured to a lever arm which is rotatably supported about an axis inclined at an angle of 45° to the horizontal.

By this means the lever arm is so connected with the reception cylinder and its bearing that the reception cylinder can be rocked from the horizontal position on the expulsion trough into the vertical position on the severing appliance, the latch being released, and the expulsion disc being pushed out of the tool slide.

The severing of the expulsion disc from the extrusion skirt is therefore effected on the transport path of the extrusion residue from the expulsion trough to the severing means, without special appliances being required for this. In the vertical position of the extrusion disc can then be removed from the extrusion residue with a usual separating means, and supplied, for re-use, by a sliding or rolling path. In this case care must be taken that the expulsion disc, and also the extrusion disc, pass to the rolling path just in the correct position.

The invention is more fully explained in detail hereunder, with reference to the accompanying drawings.

Figure 1:
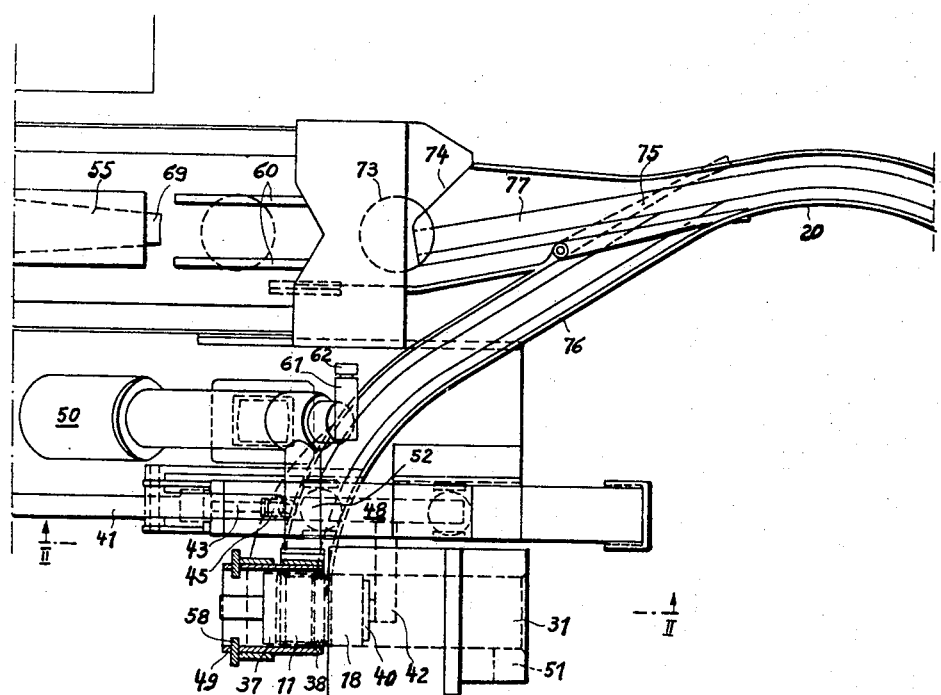
FIGURE 1 shows a metal-extrusion press as viewed from above, partly in section.
Figure 1:
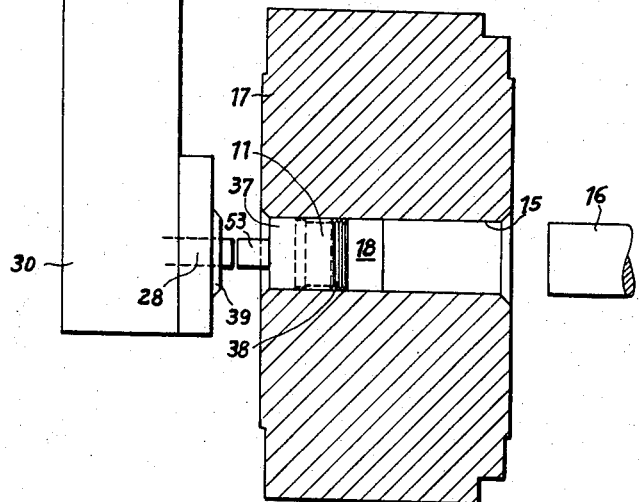
Figure 2:
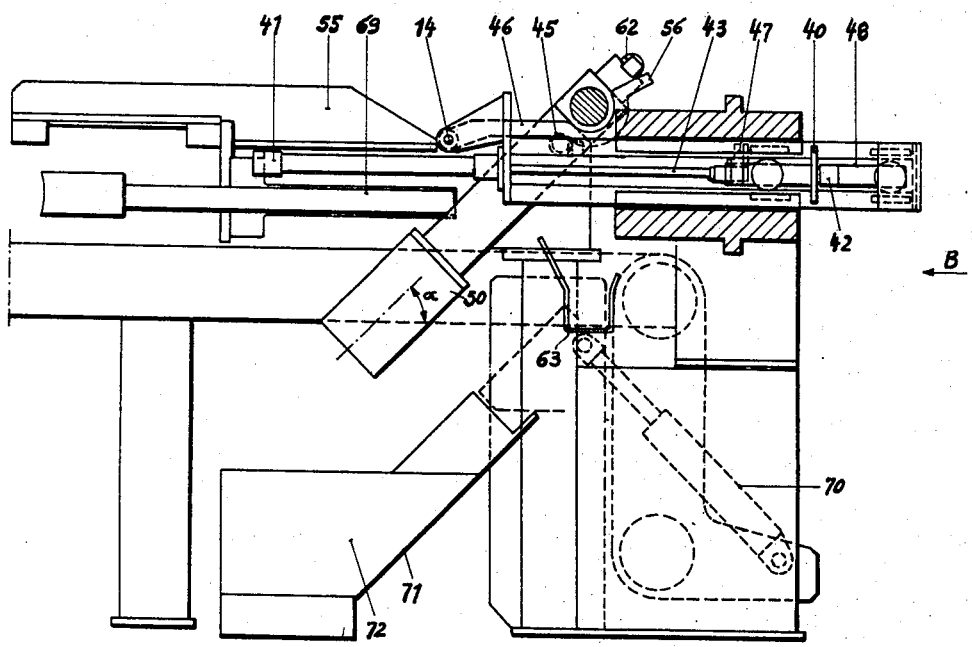
FIGURE 2 shows a side view, partly in section, on the line II—II in FIGURE 1.
Figure 3:
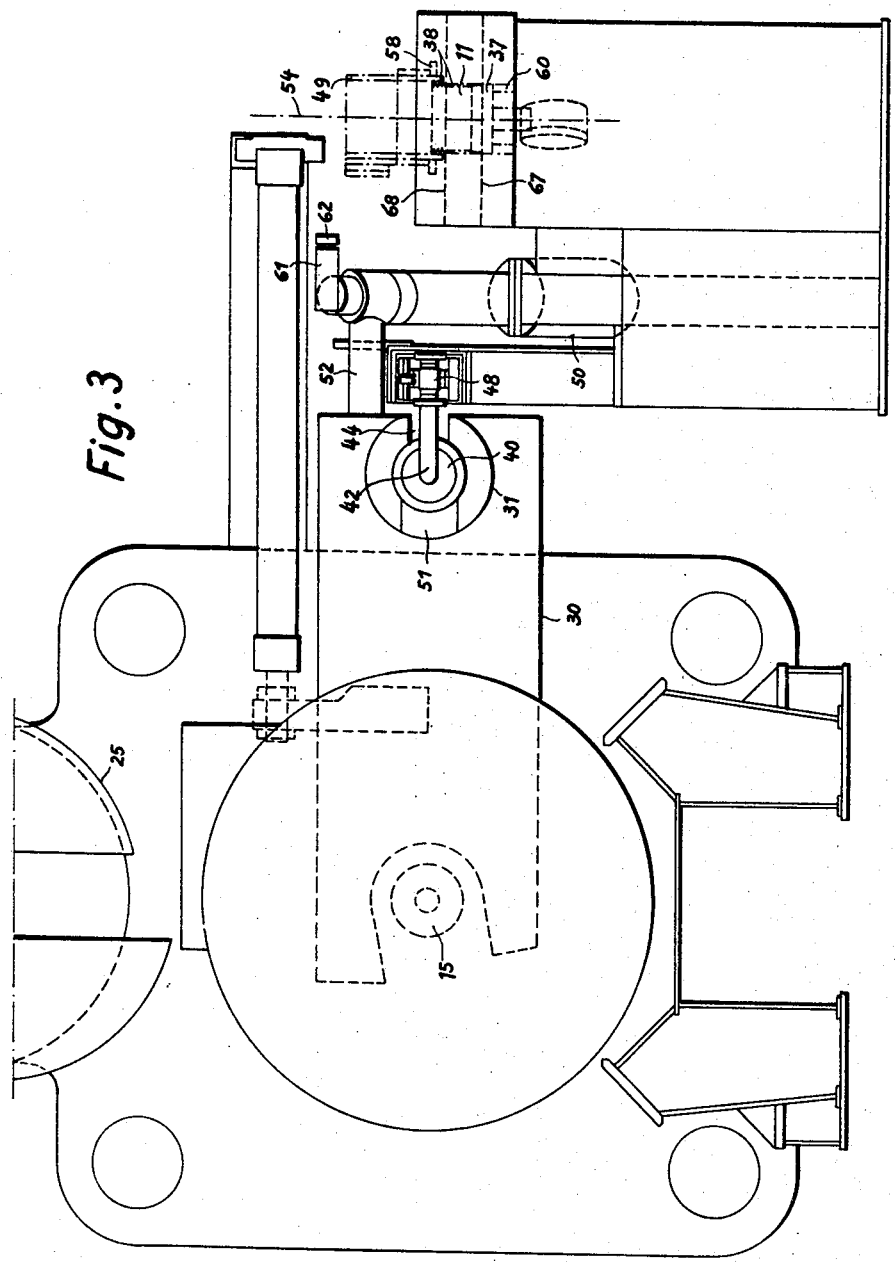
FIGURE 3 shows a view looking in the direction of the arrow B in FIGURE 2.

In the cylinder 15 of a billet-container 17 is inserted a heated metal billet, with an extrusion disc or dummy block 11 located behind it, and by pushing the press ram 16 forward an extrusion product 28 is forced out of the die 39. Thereafter the press ram 16 travels so far back that an expulsion disc or scavenging block 18 can be inserted in the container. The expulsion disc 18 is introduced into the billet-container 17 for the purpose of scraping out the cylinder 15, the extrusion skirt 38 being thus compressed. Then the press ram 16 and the container 17 move back to some extent, so that a saw 25 (FIGURE 3) can sever the extruded product 28. After the withdrawal of the severed extrusion product 28, a tool slide 30, with the die 39, is caused to travel horizontally so far that a cylindrical aperture or expulsion trough 31 takes up a position in front of the cylinder 15, a gap 51 in the trough 31 extending over the extrusion stub 53 of the extrusion residue 37. Then the billet-container 17 advances, and sets itself upon the expulsion trough 31. The press ram 16 then pushes the extrusion residue 37, with the extrusion skirt 38, the extrusion disc 11 and the expulsion disc 18 into the expulsion trough 31. After the retraction of the billet-container 17, the tool slide 30 travels back again into the initial position shown in FIGURE 1. Facing the expulsion aperture of the expulsion trough 31 is then located a reception cylinder 49, which is secured to a rocking arm 52. Beside the expulsion trough 31, and parallel to the exis thereof, is arranged a roller guide 48, which can be displaced with a piston rod 43, which slides in a cylinder 41. To the roller guide 48, moreover, is secured an arm 42, which, with a plate 40, pushes the extrusion residue 37, with the extrusion skirt 38 and the extrusion disc 11, out of the expulsion trough 31 and into the reception cylinder 49. In so doing, the arm 42 travels through a slot 44 in the expulsion trough 31. The expulsion disc 18 remains at first in the expulsion trough 31, since an abutment 47 on the roller guide 48, by coming into contact with a roller 45 on a pawl or latch 46, restricts the advance. The reception cylinder 49 is now rocked by the rocking arm 52 into the middle 54 of a severing means 55. For this purpose the rocking arm 52 is mounted on the shaft of a rotary piston 50. This rotary piston 50 is inclined at an angle of about 45° to the horizontal. The reception cylinder 49, in rocking to the severing means 55, is thereby turned from its position on the expulsion trough 31, through 90°, into a vertical position. Two abutments 58 on the reception cylinder 49 prevent the extrusion residue 37 slipping out. Only after reaching the end position in the severing means 55 are these abutments 58 released, so that the extrusion residue 37, with the extrusion skirt 38 and the extrusion disc 11, are deliverd into the severing means 55. In the first part of the rocking movement of the reception cylinder 49 out of the expulsion trough 31, the extrusion skirt 38 is torn away from the expulsion disc 18, which is still located in the expulsion trough 31. The oblique travel of the extrusion skirt 38 here assists the rupture.

At the upper end of the shaft of the rotary piston 50 is arranged a lever 61, with a roller 62. Upon rocking round from the expulsion position into the transferring position at the severing means 55, the lever 61 is likewise turned through about 180°. It thus passes beneath the outer end 56 of the pawl 46 and lifts the latter, the pawl 46 being turned about a pivot 14, so that the roller 45 is raised, and the abutment 47 of the roller guide 48 is released. The roller guide 48 can now pass into the left-hand outer end position, and in so doing pushes the expulsion disc 18 out of the expulsion trough 31. The expulsion disc 18 now falls into the entry 63 of the roll-down track 76, where it is yieldingly caught. The roll-down track 76 is inclined, and carries away the expulsion disc 18 for re-use.

The piston rod 43 pushes the roller guide 48, with the arm 42 and the expulsion plate 40, back into the original position. The piston 50, with the arm 52, rocks the reception cylinder 49 out of the severing means 55 back to the expulsion trough 31. The roller 62, with the lever 61, now returns into its original position, whereby the pawl 46, with the roller 45, falls down again, and re-establishes the limitation of the advance of the roller guide 48. The extrusion residue 37, with the extrusion disc 11, remains in the severing means 55. The severing operation for the extrusion disc 11 is initiated at the beginning of the backward swing of the reception cylinder 49.

The extrusion disc 11 is now pushed by the severing ram 69, out of the extrusion skirt 38 into the severing means 55, between the upper edge 67 of the lower severing blade and the lower edge 68 of the upper severing blade. The extrusion residue 37, with the extrusion skirt 38, are located, after the return of the severing ram 69 of the severing means 55, upon supports 60. After the return of the severing ram 69 into its initial position, a piston drive 70 rocks the supports 60 through 45° downwards, so that the severed extrusion residue 37, with the extrusion skirt 38, can slip down over a chute 71 into a container 72.

As the extrusion disc 11 is being pushed through the space intervening between the two severing blades, the expelled extrusion disc pushes in front of it an extrusion disc remaining from the preceding severing operation out of the position 73, until it falls over a tilting edge 74 into a roll-down track 77, and is supplied to a disc-circulating track 20. Here a switch-point 75, in the form of a freely rocking lever, provides that the discs, arriving alternately from a roll-down track 76 and from the roll-down track 77, are deflected into the disc-circulating track 20.

This apparatus for separating the extrusion disc and the expulsion disc from the extrusion residue and the extrusion skirt is so designed that it works automatically. The successive movements are initiated by appropriate limit switches.

The tearing-off of the extrusion skirt from the expulsion disc 18 would also be possible in a different way. For this it would be sufficient that the axis of the reception cylinder should be capable of being rocked out of the axis of the expulsion trough. Then the reception cylinder could be mounted for instance on a lever arm rotatable transversely to its axis.

What we claim is:

1. In a metal-extrusion press comprising a bolster and a billet-container, means for automatically severing a scavenging block and a dummy block from an extrusion skirt and an extrusion residue, comprising: a reception cylinder for the reception of the extrusion residue, the dummy block and the extrusion skirt, a tool slide slidable transversely to the extrusion axis of the press between the container and the bolster, a die-holder and a die carried by the tool slide, the tool slide being formed with a cylindrical receiving aperture adapted to receive from the container and to accommodate an extrusion-residue pack consisting of the scavenging block, the dummy block, the extrusion skirt and the extrusion residue, and being slidable between a position in which the cylindrical receiving aperture is in alinement with the container and a position in which it is in alinement with the reception cylinder, and the die-holder and die are in alinement with the container, a first axially acting means for expelling the extrusion-residue pack, in one position of the tool slide, from the container into the receiving aperture, a second axially acting means for expelling the extrusion residue, the dummy block and the extrusion skirt, in another position of the tool slide, from the receiving aperture into the reception cylinder, a releasable abutment for limiting the stroke of the said second axially acting means, means for severing the dummy block from the remainder of the extrusion-residue pack, a rotary piston arranged at an angle of about forty-five degrees to the horizontal, a rocking arm secured by one end to the said rotary piston and by the other end to the reception cylinder for swinging the reception cylinder from the receiving aperture to the said severing means, the said severing means consisting of two severing blades fixedly arranged horizontally one above the other with a space between them corresponding to the thickness of the dummy block, and a severing ram adapted to move horizontally into this space, the axis of this ram being parallel to the vertical plane containing the axis of the inclined piston and at the same distance from the said plane as the axis of the horizontal reception cylinder, and a horizontal support tiltably mounted between the severing blades and the severing ram.

2. Means for automatically severing a scavenging block and a dummy block from an extrusion skirt and an extrusion residue as claimed in claim 1, the inclined rotary piston being turnable through 180° for severing the scavenging block, still located in the receiving aperture, from the extrusion skirt, located in the reception cylinder, and for transporting the extrusion residue, the dummy block and the extrusion skirt to the severing means, while turning them from a horizontal position to a vertical position.

3. Means for automatically severing a scavenging block and a dummy block from an extrusion skirt and an extrusion residue as claimed in claim 2, further comprising releasable abutments in the reception cylinder adapted to support the extrusion residue, the dummy block and the extrusion skirt during the turning of the rotary piston and while they are being pushed into the reception cylinder.

4. Means for automatically severing a scavenging block and a dummy block from an extrusion skirt and an extrusion residue as claimed in claim 1, the said second axially acting means comprising: a roller guide movable parallel to the extrusion axis of the press, a piston and cylinder for moving the roller guide a releasable abutment limiting the advance of the roller guide, an arm secured to the roller guide, a plate secured to the said arm so as to be movable parallel to the roller guide, this plate being adapted in its advance to push the extrusion pack out of the receiving aperture into the reception cylinder.

5. Means for automatically severing a scavenging block and a dummy block from an extrusion skirt and an extrusion residue as claimed in claim 4, further comprising: a lever fixedly mounted on the upper end of the inclined rotary piston, this lever being adapted to release the abutment that limits the stroke of the roller guide, the plate secured to the arm on the roller guide then being adapted to push the scavenging block out of the reception aperture.

References Cited

UNITED STATES PATENTS

| | | | |
|---|---|---|---|
| 2,453,681 | 11/1948 | Temple | 83—129 |
| 2,815,127 | 12/1957 | Edgecombe | 72—253 |
| 3,129,818 | 4/1964 | Behrendt | 72—255 |

FOREIGN PATENTS 157,658  3/1964  U.S.S.R.

RICHARD J. HERBST, *Primary Examiner.*

K. C. DECKER, *Assistant Examiner.*